Patented May 1, 1928.

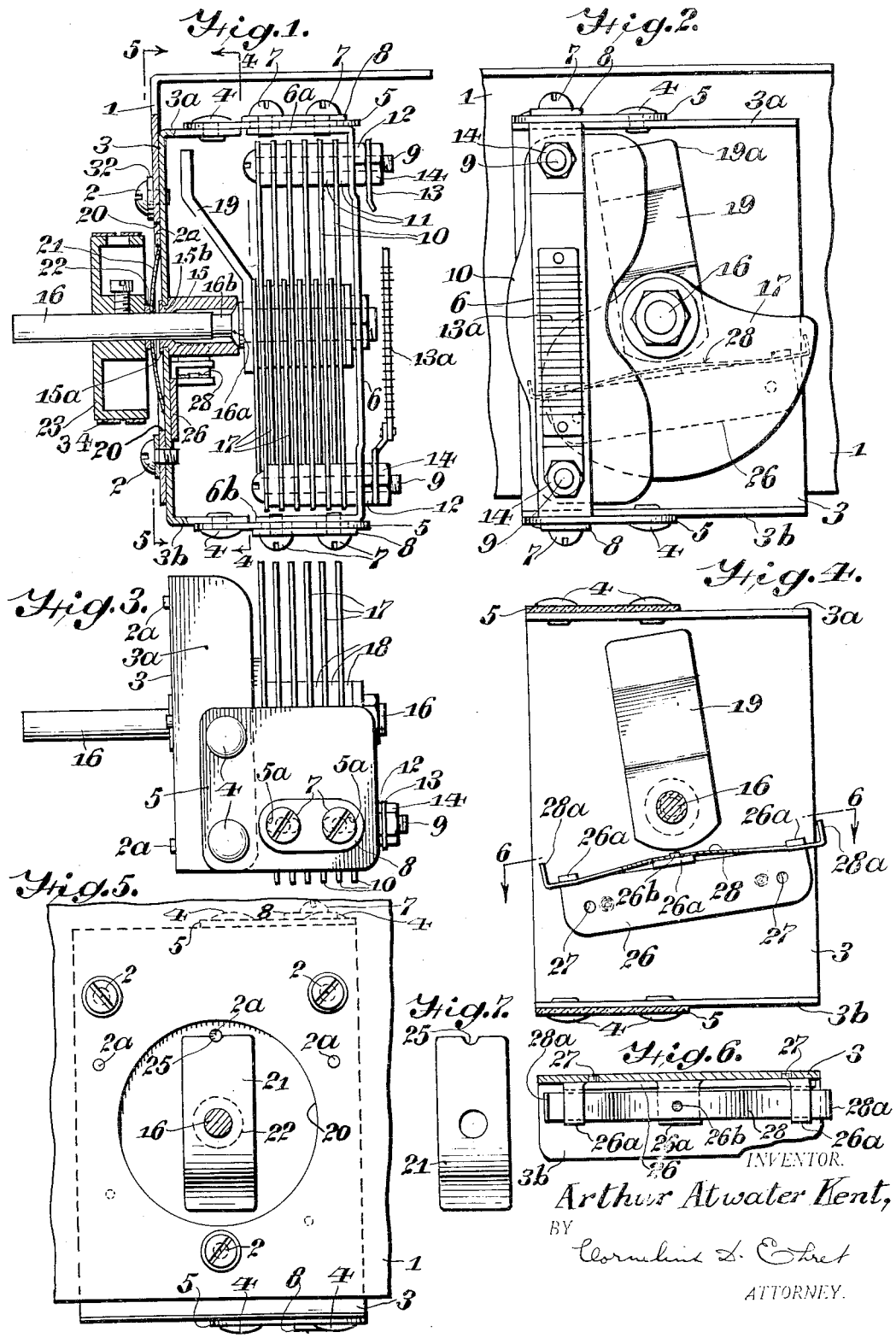

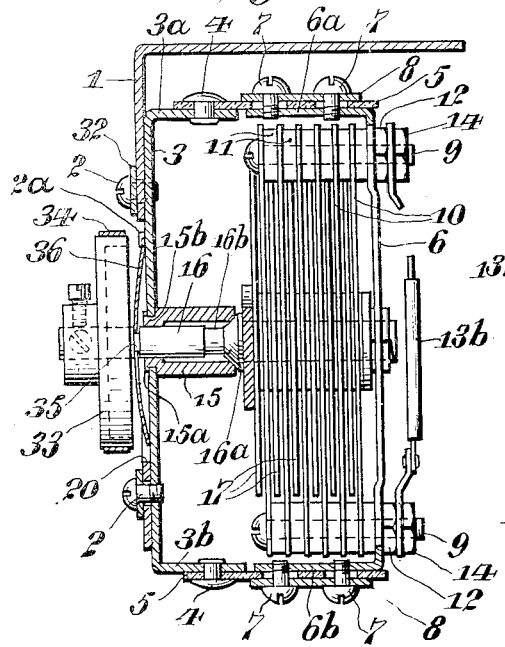

1,668,320

UNITED STATES PATENT OFFICE.

ARTHUR ATWATER KENT, OF ARDMORE, PENNSYLVANIA.

CONDENSER.

Application filed April 24, 1926. Serial No. 104,262.

My invention relates to variable electrical condensers of the plate type for variation of capacity, as in tuning of circuits, particularly circuits traversed by high frequency current or oscillations, as in radio systems.

In accordance with my invention, there is provided a condenser unit comprising a member, yoke or bracket supporting the rotor element to which, independently of the rotor and its support, is secured the stator element, and more particularly, the structure for securing the stator element to the aforesaid bracket comprises a second yoke or bracket comprising inwardly extending arms or ledges to each of which is secured a plate-like member of relatively rigid insulating material.

More particularly in accordance with my invention, the condenser unit aforesaid comprises a yoke or bracket having rearwardly extending arms or ledges disposed, respectively, preferably at angles of exactly ninety degrees with respect to the main yoke or bracket section and to each arm or ledge there is secured a plate-like member of insulating material for supporting the stator assembly which comprises members whose outer surfaces lie, respectively, in the same planes as the outer surfaces of the aforesaid arms or ledges, the aforesaid plate-like members of insulating material having one or more slots elongated along a line extending at right angles with respect to the main yoke or bracket section and through which pass screws or the like for adjustably securing the stator assembly in any desired position axially of the rotor assembly.

Further in accordance with my invention, the stator structure is supported upon a yoke or bracket having arms extending inwardly at true right-angles to the main bar of the bracket, said arms being adjustably supported, respectively, upon rearwardly extending insulation arms of the rotor supporting yoke or bracket.

Further in accordance with my invention the bracket or yoke supporting the rotor bearing sleeve is provided on its side opposite the rotor assembly with a spring exerting thrust upon the rotor shaft longitudinally of the axis of rotation of the rotor for maintaining pre-determined bearing pressure between the conical bearing surfaces of the bearing sleeve and rotor shaft; more particularly, this spring is locked into a circumferential slot on the rotor shaft and further retained against movement about the rotor shaft by one or more pins in the supporting yoke received by an aperture or apertures in the spring.

Further in accordance with my invention, there is provided a novel form of stop structure, preferably of a yielding character for preventing rotation of the condenser rotor element beyond a pre-determined point in its cycle of rotation.

My invention resides in condenser structure of the character hereinafter described and claimed.

For an illustration of some of the various forms my invention may take, reference is to be had to the accompanying drawing in which:

Fig. 1 is a vertical sectional view of apparatus constructed in accordance with my invention.

Figs. 2 and 3 are, respectively, rear and top views of the apparatus shown in Fig. 1.

Figs. 4 and 5 are sectional views taken, respectively, on the lines 4—4 and 5—5 of Fig. 1.

Fig. 6 is a sectional view taken on the line 6—6 of Fig. 4.

Fig. 7 is an elevational view of one form of bowed spring.

Fig. 8 is a vertical section of apparatus of a slightly modified form.

Fig. 9 is a rear view of a condenser showing the rotor plates entirely without the stator plates.

Fig. 10 is a front elevational view of the structure shown in Fig. 8.

Fig. 11 is a sectional view taken on the line 11—11 of Fig. 10.

Fig. 12 is an elevational view of a rotor shaft.

Fig. 13 is an elevational view of a modified form of bowed spring.

In my co-pending application Serial No. 99,696, filed April 5, 1926, upon which issued Letters Patent No. 1,658,562, February 7, 1928, there is illustrated a radio receiving set comprising a plurality of tuning devices, as variable condensers, all mounted in spaced relation on a panel with their axes normally occupying a horizontal position. In that application, there are illustrated three condensers all actuated by a single knob or handle mounted exteriorly of the front cabinet wall on the rotor shaft of the middle condenser extending therethrough, the two condenser rotors on either side being controlled by belts or bands actuated by a pulley on the shaft of the middle condenser and which pass, respectively, over pulleys secured to the rotor shafts of the adjacent condensers.

In single control apparatus of that character, it is essential that all condensers utilized for tuning the various circuits be duplicates of each other, at least in so far as concerns their electrical or capacity characteristics. In this application, there are illustrated and described condenser structures of the character above set forth, utilizable as a part of the apparatus disclosed in my aforesaid Letters Patent. However, it shall be understood that such condensers may be utilized in any other desired manner, for example, individually in conjunction with the customary dial for manual operation.

Referring to Fig. 1 of the drawing, 1 is a member, as a panel or wall, serving as the support for elements of a radio receiving set. Panel 1 may be secured interiorly of a cabinet to a wall thereof, as disclosed in my aforesaid application.

Suitably secured to the panel 1, as by screws 2, is the bracket, frame or yoke 3 terminating in the upper and lower horizontal arms, shelves or ledges $3^a$ and $3^b$, which should extend, respectively, from the yoke or frame 3 at angles of 90 degrees. To the upper and lower horizontal ledges $3^a$ and $3^b$ are secured, respectively, in any suitable manner, as by one or more rivets 4, the members or plates 5 of insulating material, as a phenol condensation product, hard rubber, or a fabric, as linen or canvas, impregnated with a phenol condensation product or the like. As herein shown, plates 5 are formed of impregnated canvas, as described above, and are secured, respectively, to the upper and lower angular portions or arms $6^a$ and $6^b$ of a second yoke or bracket 6 in any suitable manner, as by the screws 7 or the like passing through the slots $5^a$ of plates 5, Figs. 3 and 11, elongated in a direction extending at right angles from the vertical portion of frame 3 as viewed in Figs. 1 and 8. In accordance with my invention, the arms $6^a$ and $6^b$ should extend from the vertical portion of bracket 6 at angles of 90 degrees, and the outer surfaces of said angular portions should preferably lie, respectively, in the same planes in which lie the outer surfaces of the arms or ledges $3^a$ and $3^b$ of frame 3. Preferably, a washer plate 8 or the like is disposed on each plate 5 between the heads of screws 7 and the outer plate surface.

To the end that frame 3 may be secured in predetermined position on panel 1, two or more inwardly extending prongs or lugs $2^a$, preferably formed integrally with said frame, are received by correspondingly positioned openings in panel 1.

Supporting members 9, as bolts, screws or the like, pass, respectively, through bracket 6 adjacent its arms $6^a$ and $6^b$, and supported by said members 9 are the stator plates 10 held in spaced relation thereon by washers 11 or the like. In the example shown, members 9 are secured to brackets 6 by nuts 12. If desired, each member 9 may carry a lug or terminal 13 held in position thereon by a nut 14, Fig. 1. Or, and as illustrated, the lower member 9 may carry a suitable unit or structure, as a resistance, inductance, fixed condenser or the like, herein shown in Fig. 1 as a resistance $13^a$ and in Fig. 8, as a condenser $13^b$.

A bearing member 15 mounted on frame 3 and preferably extending exactly at right angles with respect to the vertical portion thereof, as viewed in Figs. 1 and 8, is mounted in an opening or perforation therein, and maintained in predetermined right angular relation with respect thereto in any suitable manner as by pressing or peening the end $15^a$ of said member on to the adjacent portion of said frame. Mounted in bearing member 15 is a shaft 16 carrying the rotor plates 17 held in spaced relation thereon by washers 18, said rotor plates interleaving with the stator plates 10. Rotor shaft 16 comprises a conical bearing $16^a$ and a reduced portion $16^b$. As clearly indicated in Fig. 1, shaft 16 has two bearing surfaces on member 15, namely, in the region where conical bearing $16^a$ engages the tapered end of member 15 and where the cylindrical portion of shaft 16 engages the portion $15^b$ of reduced diameter of member 15. Between these two bearing surfaces, shaft 16 and bearing member 15 are in non-contacting relation, whereby the friction between the parts is reduced and shaft 16 is more readily maintained in proper aligned position. If desired, rotor shaft 16 may be provided with a counterbalance weight 19.

As indicated in Figs. 1 and 5, panel 1 is provided with an aperture 20 of substantial diameter formed concentrically with respect to rotor shaft 16. A bowed spring 21 lying in the perforation 20 has a centrally disposed perforation through which freely extends the rotor shaft 16. When thus mounted, spring 21 engages a washer 22 in turn engaging a pulley, dial or the like 23 secured to said shaft for exerting thereon a longitudinal thrust toward the left, Fig. 1, to bias conical bearing $16^a$ into engagement with its seat on the end of member 15, whereby the rotor plates 17 are properly positioned within the stator plates 10.

If desired, rotation of spring 21 with respect to its shaft 16 may be prevented by passing a lug $2^a$ on condenser frame 3 into an opening or aperture 25 at or adjacent the spring end.

Suitable stop structure may be provided for limiting the extent of rotation of the condenser rotor. For example, it is desirable to thus restrict such rotation when the rotor plates have been moved to positions either wholly within or wholly without the stator plates. To this end, there may be utilized counterbalance weight 19 on shaft 16 in conjunction with suitable stop structure herein disclosed as comprising a bracket 26 or the like, suitably secured, as by a spot-welding operation, to the interior surface of the plate or bracket 3 below rotor shaft 16. By providing two or more inwardly extending prongs or lugs 27 on plate 3, bracket 26 may be secured in predetermined position thereon when correspondingly positioned openings on said bracket receive the lugs 27 aforesaid, Figs. 2 and 4. Bracket 26, in the example shown, comprises three angularly extending arms or flanges 26$^a$. Rising from the centrally disposed flange 26$^a$ is a lug or projection 26$^b$ entering an aperture in a member 28, preferably of resilient material, resting upon the centrally disposed flange 26$^a$ and passing beneath the similar flanges at the end of bracket 26.

The ends of member 28 are positioned in the path of counterbalance weight 19 and, preferably, such ends are upturned, as indicated at 28$^a$, Figs. 2 and 4, to constitute the stops.

Referring to Fig. 9 which is a rear view of the rotor and stator structures of either Figs. 1 or 8, and assuming that the stator plate structure is positioned vertically as shown, it is necessary, when the rotor plate structure is entirely without the stator plate structure, for counterbalance 19 to be tilted as shown, to effect proper counterbalancing action on said rotor plate structure. Accordingly, when so arranged, to restrict rotation of the rotor plates, either when wholly within or wholly without the stator plates, bracket 26 and resilient member 28 should be tilted or inclined at an angle from the true horizontal plane, as indicated in Fig. 10.

In Fig. 8, I have illustrated a form of condenser whose rotor shaft may be mechanically coupled or connected to a manually-operated rotor shaft of another condenser; or utilized as a single condenser with a dial manually operated. The tuning structure, namely rotor and stator, or that lying to the right of and including the condenser frame or bracket 3, should be and preferably is a duplicate of the corresponding structure illustrated in Fig. 1. Moreover, stop-structure for preventing over-traveling of the rotor shaft is ordinarily not required on a condenser which is coupled or connected to a condenser like that shown in Fig. 1, which already includes stop-structure for preventing over-traveling of its rotor shaft. Accordingly, the condenser of Fig. 8 is shown without rotor shaft stop-structure of any kind.

When the condensers of Figs. 1 and 8 are mounted side by side on the same panel, it is desirable that the condenser frame 3 of the condenser of Fig. 1 be non-adjustably mounted on said panel, whereas the similar frame 3 of the condenser of Fig. 8 is preferably mounted for adjustment in a horizontal direction on said panel. To this end, panel 1 may be provided with the slots 30 elongated in a horizontal direction, as viewed in Fig. 10, through which pass the lugs 2$^a$ projecting transversely of frame 3. Panel 1 should also be provided with the similarly elongated slots 31 through which pass the screws 2 or the like for securing frame 3 to said panel. In a construction of this character it is desirable that there be utilized a washer plate 32 extending between the two horizontally aligned screws 2 and located between the said screws 2 and plate or member 1 shown near the top of Fig. 10.

The rotor shaft 16 of the condenser of Fig. 8, in the example shown carries a pulley 33 of a width slightly greater than the width of the belt, band or the like 34 driving the same from the manually operated rotor shaft of the adjacent condenser, which may be the condenser shown in Fig. 1 carrying a pulley 23 mounted on its rotor shaft 16. Mechanical coupling of rotor shafts with associated features is claimed in my application Serial No. 79,100, filed January 4, 1926. Due to the construction described above for adjusting the condenser of Fig. 8 horizontally on its supporting panel and, as described in my application, Serial No. 244,605, filed January 5, 1928, the proper degree of tension may be imparted to the belt or band 34 extending between the two condensers.

In the example illustrated, the rotor shaft 16 of the condenser of Fig. 8 is a duplicate of the rotor shaft illustrated in Fig. 1, with the exception that in Fig. 8 shaft 16 is somewhat shorter and, moreover, is provided with a circumferential groove 35, Figs. 8 and 12. The larger diametrical portion of a key-shaped slot disposed centrally of a bowed spring 36, Fig. 13, may be passed along the rotor shaft 16 illustrated in Fig. 8 when the pulley 33 is removed therefrom. When spring 36 is in substantially the position indicated in Fig. 8, it may be moved transversely of said shaft to position the periphery of the small diametrical portion of the aforesaid key-shaped slot in the circumferential groove 35. When thus positioned, spring 36 exerts an axial thrust on shaft 16 to maintain conical bearing 16$^a$ in engagement with its seat on bearing member 15.

If desired, rotation of spring 36 with respect to its shaft 16 may be prevented by passing a lug 2ª on condenser frame 3 into an opening or aperture 37 at or adjacent the spring end.

In a structure of the character illustrated by Fig. 1 the tension of the spring 21 is determined by the position upon the shaft 16 at which is secured the operating knob or dial or the pulley 23. In Fig. 8 the tension of the spring 36 is independent of the position of the operating knob or dial, or pulley 36, upon the shaft 16 and is dependent upon the position of the left shoulder of the shaft groove 35 with respect to the front face of the bracket or yoke member 3 upon which the spring bears.

In the arrangement of Fig. 8, wherein the spring 36 engages at its aperture against a shoulder of the groove 35 of the rotor shaft 16, the lug 2ª engaging in the notch 37 at the edge of the spring holds the spring not only against rotation, but also locks it in operative position as regards its thrust upon the shaft 16. To remove the spring its notched end 37 is lifted to clear the lug 2ª, whereupon the spring may be moved to position where the larger portion of its aperture registers with the shaft 16, whereupon the spring may be withdrawn over it.

The rotor plates 17 may be moved, particularly as indicated in Fig. 9, for example to position in which there is no interleaving with or overlap of the stator plates 10. It may then obviously be withdrawn from the condenser structure or unit if the structure otherwise permits, and this is the fact, for simply by moving the spring 36 transversely of the shaft 16 from its thrust exerting-position, assuming the pulley 33 removed, the rotor element or unit as a whole is withdrawable toward the right, Fig. 8. This is possible further because the spring operates upon a shaft in a single bearing system and where the thrust of the spring holds the shaft in its normal bearing position.

Condenser structures in large quantities of the types above described may be readily assembled with the assurance that there will be little or no variation between individual condensers without the aid of any substantial amount of skilled labor. To this end, it is important that close attention be paid to the formation of the individual condenser parts and to the correct assembly thereof.

For example, the condenser frames 3 should always be duplicates, and the portions or ledges 3ª and 3ᵇ thereof should extend from the vertical portions of frames 3, Figs. 1 and 8, at angles of 90 degrees. The somewhat similar bracket 6 should likewise be so formed that its ledges or flanged portions 6ª and 6ᵇ extend from the vertical portion of said bracket 6, Figs. 1 and 8, at angles of 90 degrees. Moreover, the outer surfaces of the pairs of ledges 3ª, 6ª and 3ᵇ, 6ᵇ should preferably lie in the same planes, thereby presenting an even surface for the plates 5.

Obviously, the various plates entering into the stator assembly should be duplicates both as regards configuration and thickness, as should the plates for the rotor assembly. The spacing washers for the stator plates should invariably have the same thickness. The washers for the rotor plates should likewise be carefully graded.

The bearing member 15 for the rotor shaft when secured to frame 3 should extend at an angle of 90 degrees with respect thereto so as to be in parallel relation with the pairs of ledges 3ª, 6ª and 3ᵇ, 6ᵇ.

All of the rotor shafts, no matter for which type of condenser, should be of the same length, except that the shaft of one condenser should be longer to extend to the exterior of the cabinet where there is attached a knob or dial for uni- or single dial control.

After the various parts have been assembled in the proper manner, but before screws 7 have been tightened, and while the bowed spring is exerting a thrust on the rotor shaft to maintain its conical bearing in engagement with its seat, a suitable gauge or the like should be passed between adjacent rotor and stator plates to ensure proper spacing thereof, whereupon screws 7 may be tightened, to clamp plates 5 to the respective ledges 6ª and 6ᵇ for properly positioning the stator assembly with respect to the rotor assembly.

A careful observance of the various manufacturing operations of the various parts, together with the proper assembly thereof, of which the foregoing are the most important, will ensure large scale production and at the same time eliminate the heretofore necessary time-consuming tests of the electrical characteristics of each individual condenser.

Mechanical coupling of rotors of condensers and their mountings and associated features of the character herein disclosed are claimed in my aforesaid application Serial No. 244,605, filed January 5, 1928.

What I claim is:

1. In a condenser unit, a frame comprising a main section and a ledge meeting at right angles, a rotor element supported by said frame, a stator element, a second frame directly connected to said stator element comprising a ledge lying in the plane of said first-mentioned ledge, and means for connecting said ledges to secure said stator element in position.

2. The combination with a frame, of a stator element secured in fixed position with respect thereto, a rotor element whose shaft extends through said frame, and a bowed spring having a key-shaped slot, the slot at its smaller diameter lying within a circumferential groove of the shaft.

3. Condenser structure comprising a frame, a stator element secured in fixed position with respect thereto, a rotor element having a shaft extending through said frame, an arm on said shaft, a flanged bracket carried by said frame, and a spring member secured to said bracket normally engaging a flange and adapted to be engaged at its end by said arm for limiting rotative movement of said rotor element and shaft.

4. Condenser structure comprising a frame, a stator element secured in fixed position with respect thereto, a rotor element having a shaft extending through said frame, a counterweight element on said shaft, a bracket carried by said frame, and a member detachably carried by said bracket for engaging said counterweight element to limit rotative movement of said rotor element and shaft.

5. An condenser comprising a frame, a rotor element supported by said frame, a stator element, thin plates of insulating material secured to said frame and of substantial width in a plane normal to the face of said frame, and means including said plates for adjustably supporting said stator element upon said frame in operative position with respect to said rotor element.

6. A condenser comprising a frame, a rotor element supported by said frame, a stator element, and thin plates of insulating material secured to said frame and of substantial width in a plane normal to the face of said frame, for supporting said stator element upon said frame, said plates being provided with slots to permit adjustment of said stator element with respect to said rotor element.

7. The combination with a frame, of a rotor element having a shaft extending through said frame, a stator element held in operative relation with respect thereto, and a spring having a slot of different widths, the slot at its greater width permitting movement of the spring axially of said shaft and at a lesser width lying within a circumferential groove of the shaft to exert a thrust thereon.

8. Condenser structure comprising in combination a metal frame having an integral arm having a flat face extending at right angles thereto, a rotor element whose axis is parallel to said arm, a stator element having a flat face whose plane is parallel to the axis of said rotor element, a plate of insulating material having a large area parallel to the flat faces of said stator element and arm, respectively, and secured flatwise to said faces of said stator element for securing said stator element to said frame, and means including said plate of insulating material for effecting relative adjustment between said stator and rotor elements.

9. Condenser structure comprising in combination a metal frame having integral arms having flat faces extending at right angles thereto, a rotor element, a stator element, a second metal frame comprised in said stator element, integral arms on said second frame having flat faces extending at right angles thereto toward said first named arms, plates of insulating material having large areas parallel to the flat faces of the arms of both frames and secured flatwise thereto, and means for adjusting each of said plates with respect to one of said frames to effect relative adjustment between said rotor and stator elements.

10. Condenser structure comprising in combination a metal frame having integral arms extending at right angles thereto, a rotor element, a stator element, a second metal frame having integral arms extending at right angles thereto, said stator element comprising a plate assembly secured to said second frame between its arms, and plates of insulating material each having a large area parallel to the arms of said frames, and means for securing each of said plates to arms of said frames and adjustably with respect to an arm of one of said frames for supporting said stator element in operative relation to said rotor element.

11. Condenser structure comprising in combination a pair of metal frames each having integral arms extending at right angles thereto, a rotor element, a stator element, the arms of different frames spaced from each other longitudinally of the axis of the rotor element, and plates of insulating material having large areas parallel to the faces of said arms and overlapping the arms of the different frames and adjustably securing them to each other, said stator element carried by one of said frames, and said rotor element carried solely by the other of said frames.

12. Condenser structure comprising the combination with a support, of rotor and stator elements, said rotor element having a shaft with portions of different diameters to form a shoulder, a plate spring engaging said support and having an aperture embracing said shaft and thrusting against said shoulder, and a member carried by said support holding said spring it is shoulder-engaging position.

13. Condenser structure comprising the combination with a support, of rotor and stator elements, said rotor element having a shaft with portions of different diameters to form a shoulder, a plate spring engaging said support and having a slot of different widths, the slot at its greater width permitting movement of the spring axially of said shaft and at a lesser width engaging said shoulder to exert an axial thrust on said shaft, and means carried by said support and engaging said spring at an edge thereof for holding it in its thrust-exerting position.

14. Condenser structure comprising the combination with a support, of rotor and stator elements, said rotor element having a shaft with portions of different diameters to form a shoulder, a plate spring engaging said support and having a slot of different widths, the slot at its greater width permitting movement of the spring axially of said shaft and at a lesser width engaging said shoulder to exert an axial thrust on said shaft, and a stud carried by said support, said spring having at its edge a notch engaging said stud to hold said spring in its thrust-exerting position.

15. Condenser structure comprising the combination with a support, of a stator element, a rotor element having a shaft having a circumferential groove to form a shoulder, said rotor element being rotatable to position in which it is free of interleaving relation with said stator element, a single bearing for said rotor element carried by said support, and a plate spring engaging said support and movable transversely of said shaft and having an aperture at which it engages said shoulder to exert on said shaft an axial thrust to hold said shaft in operative relation with respect to said bearing, said rotor element being removable in an axial direction upon removal of said spring from said groove.

16. The combination with a rotor element of a condenser, of yielding stop structure comprising a member included in said element and a leaf spring engaged thereby, and a fixed abutment towards which said spring is biased and serving to define the rotor stopping position of said spring.

17. The combination with a rotor element of a condenser, of yielding stop structure therefor comprising a pair of abutments, a third abutment between them, a leaf spring extending over said third abutment biased against the under sides of said pair of abutments, and means movable with said rotor element adapted to engage said spring at points on opposite sides of said third abutment and in directions opposite to the direction of bias of said spring.

18. Condenser structure comprising in combination a metal frame having an integral arm having a flat face extending at right angles thereto, a rotor element mounted solely on said frame and whose axis is parallel to said arm, a second metal frame having an integral arm having a flat face extending toward said first named arm and spaced therefrom longitudinally of the axis of said rotor element, a stator element secured directly to said second frame independently of its arm, and a thin plate of insulating material secured to said arms flatwise against their said flat faces for securing said stator element to said first named frame.

ARTHUR ATWATER KENT.